(12) United States Patent
Rosenbauer

(10) Patent No.: US 8,884,472 B2
(45) Date of Patent: Nov. 11, 2014

(54) HOUSEHOLD APPLIANCE AND CONTROL MODULE FOR SUCH A HOUSEHOLD APPLIANCE

(75) Inventor: Michael Georg Rosenbauer, Reimlingen (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 592 days.

(21) Appl. No.: 13/209,463

(22) Filed: Aug. 15, 2011

(65) Prior Publication Data

US 2012/0049652 A1 Mar. 1, 2012

(30) Foreign Application Priority Data

Aug. 26, 2010 (DE) .......................... 10 2010 039 836

(51) Int. Cl.
*H01H 9/54* (2006.01)
(52) U.S. Cl.
USPC ........................................ 307/140

(58) Field of Classification Search
USPC ......................................................... 307/140
See application file for complete search history.

(56) References Cited

U.S. PATENT DOCUMENTS

| 2004/0220869 A1* | 11/2004 | Perera ............................ 705/37 |
| 2008/0272934 A1* | 11/2008 | Wang et al. ............. 340/870.11 |
| 2012/0053752 A1* | 3/2012 | Rosenbauer .................. 700/297 |
| 2013/0038468 A1* | 2/2013 | Wang et al. ............. 340/870.02 |

\* cited by examiner

*Primary Examiner* — Robert L. Deberadinis
(74) *Attorney, Agent, or Firm* — James E. Howard; Andre Pallapies

(57) ABSTRACT

A household appliance includes an electronic control facility controlling at least one appliance component of the household appliance, and a connection adapted for connecting the household appliance to a network connection line to supply the household appliance with electrical energy. The connection has at least one interface contact, wherein electricity tariff information is routed from an energy supplier to the control facility, when the interface contact is contacted.

24 Claims, 4 Drawing Sheets

HOUSEHOLD APPLIANCE AND CONTROL MODULE FOR SUCH A HOUSEHOLD APPLIANCE

BACKGROUND OF THE INVENTION

The invention relates to a household appliance, in particular a water-conducting household appliance, having an electronic control facility for controlling at least one appliance component of the household appliance, the household appliance featuring connection means for connection to a network connection line to supply the household appliance with electrical energy, the connection means additionally featuring at least one interface contact for a control module.

It is known that energy supply companies use ripple control systems to issue control commands to operating systems which also operate at night, for example steel making or agricultural operating systems. Such a ripple control system can be used to activate or deactivate suitable consumers in the energy supply network of an energy supply company by remote control. This allows control of the load at which said consumers are operated during heavy load periods in the energy supply network, allowing load peaks to be avoided during the main load period.

This allows the starting up of the household appliance, for example a dishwasher, to be timed so that it is possible to take advantage for example of the favourable night electricity tariffs of energy supply companies.

BRIEF SUMMARY OF THE INVENTION

It is an object of the invention to provide a household appliance, with which favourable electricity tariffs can be utilised in a more flexible manner.

According to the invention provision is made for it to be possible for electricity tariff information to be routed from the energy supplier to the control facility when the interface contact is contacted. This information is therefore available at the appliance and can be displayed to a user for selection and/or used at the appliance for optimization purposes. The contacting of the interface contact can be effected by means of the connection means or other elements, e.g. corresponding insertable units. Transmission of the electricity tariff information can preferably take place in a wired manner by way of the interface contact itself or in a different manner, e.g. wirelessly by means of electromagnetic waves or by means of optical signals. The electricity tariff information itself can be transmitted by way of ripple control signals, WLAN, internet or the like.

Provision is preferably made for it to be possible to connect the interface contact to the control facility to form a signal connection to route the electricity tariff information. The connection means here can be configured as connection port that can be connected to a plug of a network connection line to supply energy to the household appliance.

The functional principle of the appliance-side connection port corresponds to that of a refrigeration appliance plug that has the dual function of featuring both network contacts for the supply voltage and for earth protection as well as additional interface contacts, by way of which communication can be set up between the energy supplier and the electronic control facility of the household appliance. The interface contacts of the appliance-side connection port can be connected by way of data bus lines to the control facility. According to the invention therefore a control interface is also integrated in the connection port in addition to the network contacting means.

The control module can preferably be connected to the appliance-side connection port directly or with a corresponding line connected in between. The control module can thus be attached to the outside of the household appliance and removed therefrom without tools as a separate, retrofittable part. The control module can also optionally be purchased later as a retrofittable part by the customer and integrated in the household appliance.

The control module can preferably be disposed as an external part not remote from the appliance between the network connection line and a plug socket on the wall but connected directly in series between the connection line and the household appliance.

The inventive appliance-side connection port with its interface contacts can alternatively also be used during the final appliance fitting as an interface for appliance programming. To this end a programming facility can be contacted with the appliance-side connection port so that appliance programming can take place directly by way of the interface contacts of the connection port.

The control module can feature a ripple control signal receiver. The ripple control signal receiver allows ripple control signals to be transmitted from the electricity supplier to the electronic control facility of the household appliance, thereby allowing remote control of the household appliance by the ripple control system of an energy supply company.

The ripple control signals received for the remote control of the household appliance can relate for example to different electricity tariffs offered by the energy supplier to whose energy supply network the household appliance is connected. As a function of the ripple control signal received the control facility of the household appliance can determine a time period for appliance operation, terminate appliance operation or adjust its process parameters during ongoing operation.

To achieve degrees of freedom in respect of the configuration of the network connection of the household appliance, the network connection line and/or the control module and the household appliance can form a plug-in system, in which the network connection line, the control module and/or the household appliance can be coupled to one another in a non-permanent plug-type connection.

Further adapters can also be integrated in the above-mentioned plug-in system in addition to the control module simply by plugging in. For example a powerline adapter can be integrated for a remote display away from the household appliance. Alternatively or additionally a customer service adapter can be integrated so that the customer service department can identify error states in the household appliance.

The control module can feature electrical contacts for the power supply on its side facing the household appliance and also additional electrical contacts for the transmission of control signals. These additional contacts can in particular be connected to the interface contacts of the connection port of the household appliance.

In contrast the control module can feature electrical contacts for the connection of the plug of the network connection line on its network side.

The inventive household appliance can be supplied to the customer in a basic embodiment and in an extended embodiment. In the basic embodiment of the household appliance there is no control module. In other words the connection line plug is then connected directly to the connection port of the household appliance, and no control signals are picked off from the interface contacts of the connection port.

In the extended embodiment the set or appliance system consisting of the household appliance and the network connection line can be extended to include the control module, thereby allowing remote control of the household appliance using ripple control signals.

So that the basic embodiment of the household appliance can be fitted as economically as possible with the simplest electronic control system possible, it may be advantageous if the filtering out, decoding and deriving of a control signal that can be processed by the control facility are not executed by the household appliance's own electronic system but can take place directly in the control module. With this in mind the control module can have an evaluation unit, in which the above-mentioned signal processing can take place independently of the household appliance electronic system.

BRIEF DESCRIPTION OF THE DRAWINGS

An exemplary embodiment of the invention is described below with reference to the accompanying figures, in which:

FIG. 2 shows an extended embodiment of the network connection region of the household appliance with a control module connected in between;

DETAILED DESCRIPTION OF EXEMPLARY EMBODIMENTS OF THE PRESENT INVENTION

Figure 1:
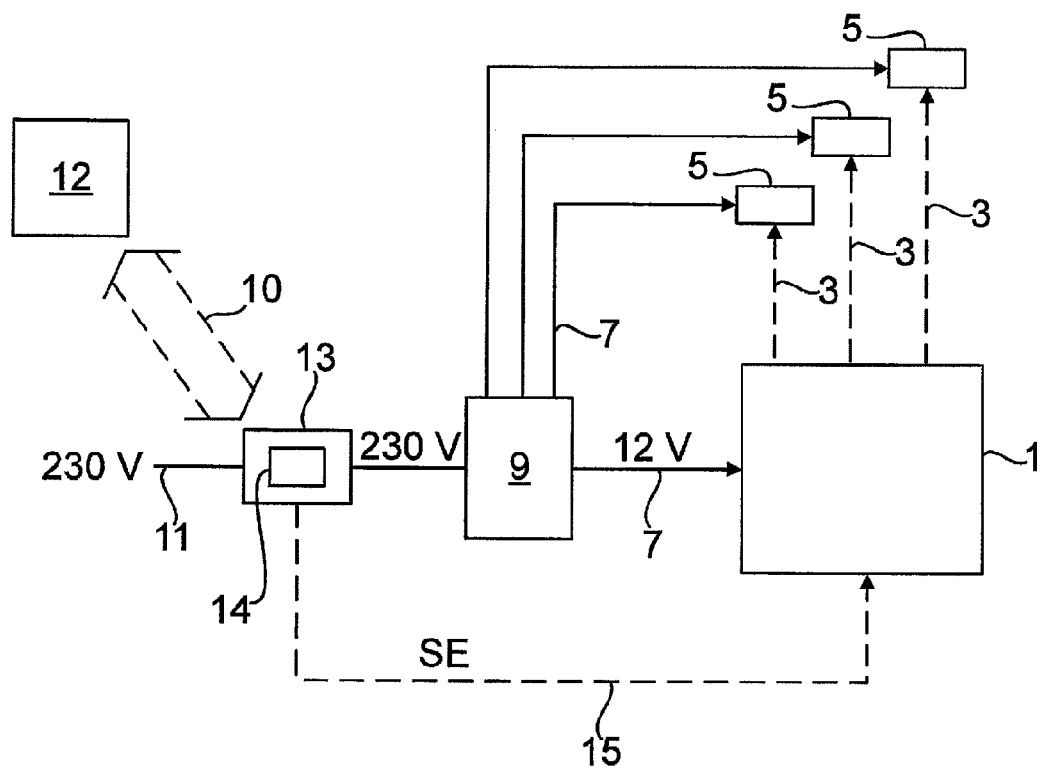
FIG. 1 shows a basic diagram of a highly simplified circuit diagram of the household appliance.

As shown in FIG. 1, the household appliance, in the present exemplary embodiment a water-conducting household appliance, features an electronic control facility 1, which activates different appliance components 5 by way of signal lines 3 shown with a broken line. In the case of a dishwasher for example these may be inter alia a circulating pump, a water heater or a fluid valve. The appliance components 5 and the control facility 1 are supplied with low voltage from a network part 9 by way of supply lines 7. The network part 9 is in turn connected to the power supply network by way of a network connection line 11.

According to FIG. 1 a control module 13 is connected in series upstream of the network part 9. The control module 13 is has a bidirectional signal connection 10 to the energy supplier 12, to whose energy supply network the household appliance is connected. The bidirectional signal connection 10 allows the control module 13 on the one hand to request information about electricity tariffs directly from the energy supplier 12. On the other hand the energy supplier 12 can transmit network information to the control module 13. The bidirectional data transmission between the control module 13 and the energy supplier 12 can take place for example by way of ripple control signals, WLAN, internet or the like.

In FIG. 1 the control module 13 by way of example features a ripple control signal receiver with an evaluation unit 14, which can be used to filter a ripple control signal out of the power supply network and decode it. The evaluation unit 14 here can derive a control signal $S_E$, which is routed by way of a signal connection 15 to the control facility 1. Since ripple control signals generally relate to corresponding electricity tariffs from the energy supplier 12, the control facility 1 receives control commands by way of the control module 13, on the basis of which control commands the control unit 1 can start operation of the household appliance at a predefined start time, terminate it or adjust process parameters during ongoing operation.

Figure 2:
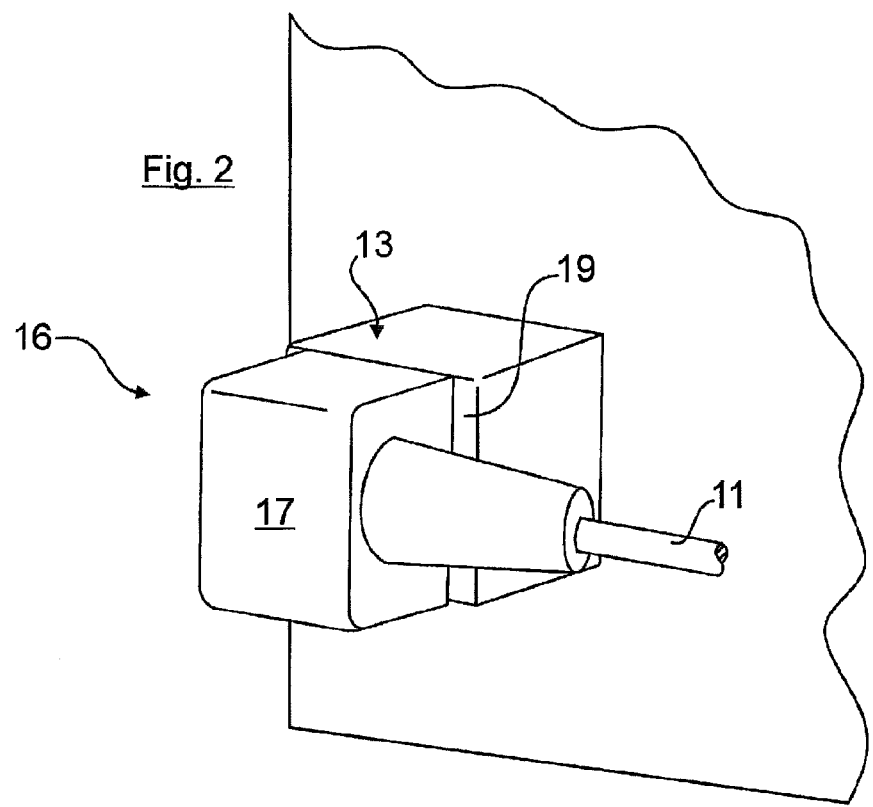
Figure 3:
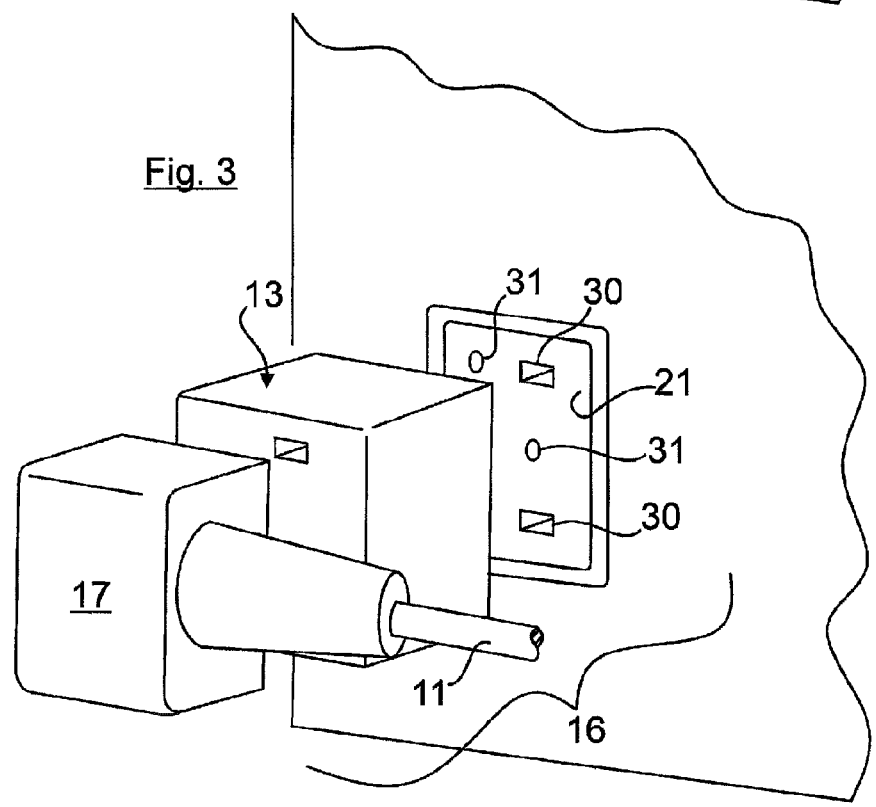
FIG. 3 shows an exploded view of the network connection region.

According to FIGS. 2 to 4 the control module 13 is embodied as an intermediate adapter that is separate from the household appliance and can be positioned on the outside of the network connection region of the household appliance. As shown in FIG. 2, the network connection line 11 is not passed in a fixed place into the interior of the housing of the household appliance but is connected to the household appliance by way of a plug-in system 16.

In the plug-in system 16 according to FIG. 2 the network connection line 11 is plugged into the plug side 19 of the control module 13 with an electric plug 17. The control module 13 in turn is plugged in a similarly non-permanent manner into an electrical connection port 21 serving as a connection means, which is provided on the rear of the appliance in the lower corner region and is shown in FIG. 3 and in FIG. 6, which is described below. The electric plug 17, the control module 13 and the electrical connection port 21 are thus integrated in the plug-in system 16 and can be connected to one another or detached from one another without tools, as shown in the exploded view in FIG. 3.

Figure 4A:
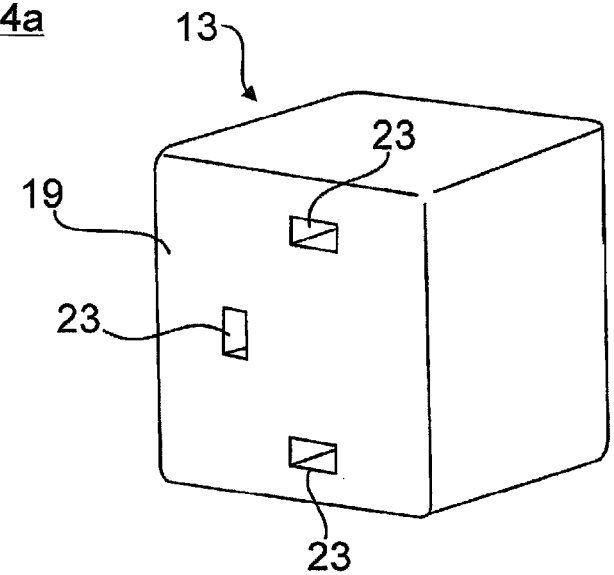
FIG. 4a and FIG. 4b each show different views of the control module.
Figure 4B:
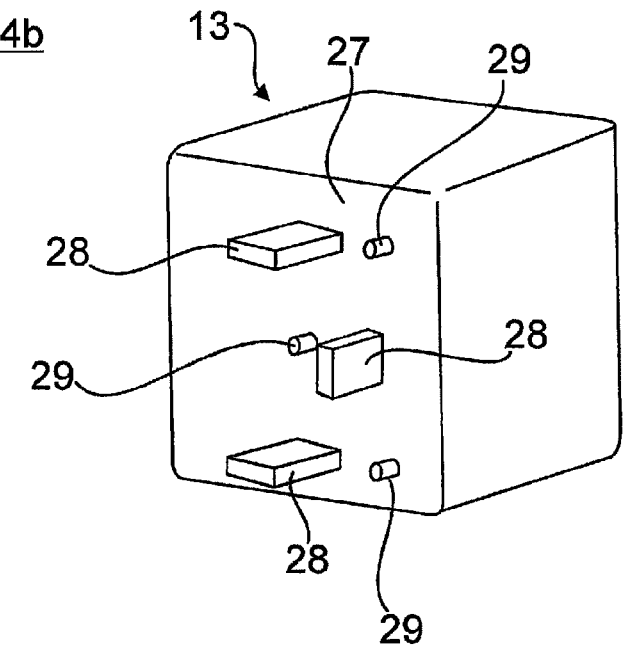

Different views of the control module 13 are shown respectively in FIGS. 4a and 4b. Thus FIG. 4a shows the network side 19 with electrical contacts 23. The corresponding electrical contacts 25 of the plug 17 of the network connection line 11 shown in FIG. 6 can be plugged into the electrical contacts 23 of the control module 13.

Opposite the network side 19 the control module 13 also has electrical contacts 28 for the power supply on its appliance side 27. The appliance side 27 also features electrical interface contact pins 29. Both the power supply contacts 28 and the interface contact pins 29 of the control module 13 can be connected to corresponding contacts 30, 31 of the connection port 21. The interface contacts 31 of the electrical connection port 21 here are connected by way of the signal line 15 shown in FIG. 1, for example one or more data bus lines, to the control facility 1, while the power supply contacts 31 are connected to the network part of the household appliance.

The interface contacts 31 of the connection port 21 can for example form a single wire interface, it being possible for the interface contacts 31 to be configured as a supply voltage contact, a reference potential contact and as a data line contact.

In the exemplary embodiment shown the control module 13 is a retrofittable part that can optionally also be included in the appliance system or can be retrofitted into the appliance system at a later time.

Figure 5:
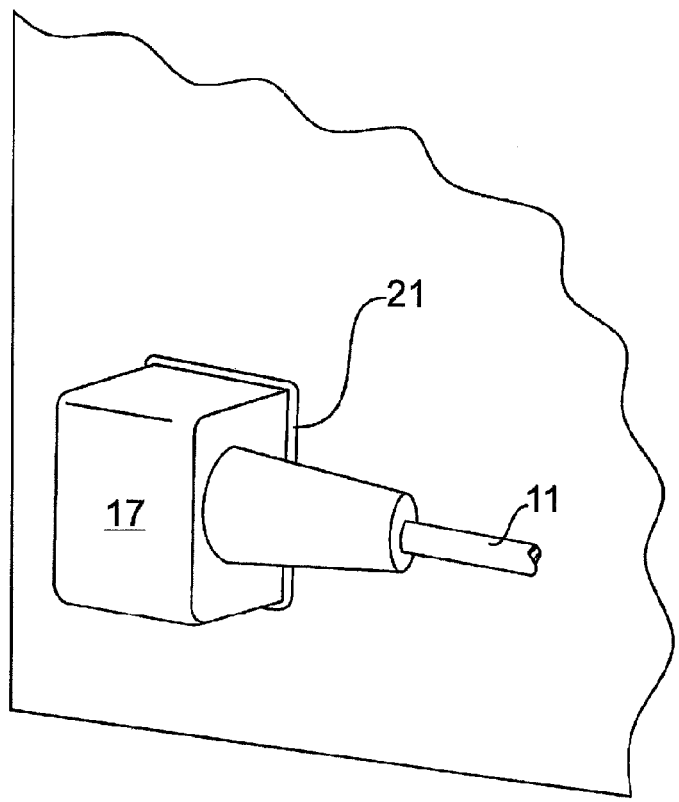
FIGS. 5 and 6 each show the network connection region of a basic embodiment of the household appliance with the network connection line plugged in and unplugged.
Figure 6:
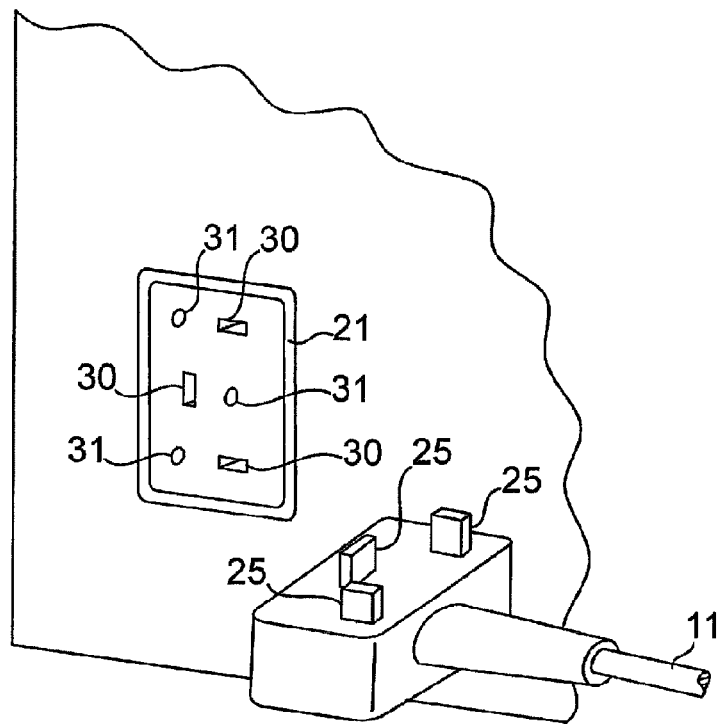

FIGS. 5 and 6 therefore show a basic embodiment of the appliance system, with the control module 13 omitted. The electrical connections 25 of the plug 17 of the network connection line 11 here are plugged directly into the corresponding power supply connectors 30 of the connection port 21. In contrast no signal is supplied to the interface contacts 31 of the electrical connection port 21.

With optional retrofitting the appliance system shown in FIGS. 5 and 6 can be extended to include the control module 13. Such an extended embodiment is shown in FIGS. 2 and 3. As mentioned above, in this extended embodiment the control module 13 is connected between the plug 17 of the network connection line 11 and the electrical connection port 21 of the household appliance. When the control module 13 is retrofitted in this manner, the control facility 1 can only be adapted for example by means of a software update, in order to control operation of the household appliance correspondingly based on the ripple control signals received.

What is claimed is:

1. A household appliance, comprising:
   an electronic controller controlling at least one appliance component of the household appliance; and
   a connection adapted for connecting the household appliance to a network connection line to supply the household appliance with electrical energy, said connection having at least one interface contact, wherein electricity tariff information is routed from an energy supplier to the controller, when the interface contact is contacted.

2. The household appliance of claim 1, constructed in the form of a water-conducting household appliance.

3. The household appliance of claim 1, wherein the electricity tariff information is routed via the contacted interface contact.

4. The household appliance of claim 1, further comprising a control module connected to the interface contact to establish a signal connection to route the electricity tariff information to the controller.

5. The household appliance of claim 4, wherein the control module is connected in series between the connection and the network connection line.

6. The household appliance of claim 1, further comprising a programming facility constructed for contacting the connection to allow execution of an appliance programming via the interface contact of the connection, when the household appliance is assembled.

7. The household appliance of claim 4, further comprising a signal connection between the control module and the energy supplier.

8. The household appliance of claim 4, wherein the signal connection is bidirectional.

9. The household appliance of claim 4, wherein the control module includes a ripple control signal receiver to transmit ripple control signals from the energy supplier to the controller.

10. The household appliance of claim 4, wherein each control signal transmitted by the signal connection to the controller relates to an electricity tariff from the energy supplier, said controller being configured to initiate an action selected from the group consisting of setting a start of operation of the household appliance, terminating operation, and adjusting process parameters during operation, in response to the control signal transmitted by the signal connection to the controller.

11. The household appliance of claim 4, wherein the control module is configured as a separate part from the household appliance to allow retrofitting of the household appliance.

12. The household appliance of claim 4, wherein at least one of the network connection line and the control module forms together with the household appliance a plug-in system to allow detachable plug-type connection of the network connection line to the household appliance directly or through intervention of the control module.

13. The household appliance of claim 4, wherein the control module has electrical contacts for power supply and data contacts for transmission of control signals at an appliance side facing the interface contact.

14. The household appliance of claim 4, wherein the control module has electrical contacts for connection of a plug of the network connection line at a network side facing the network connection line.

15. The household appliance of claim 9, wherein the ripple control signal receiver includes an evaluation unit, which filters a received ripple control signal out of the network and/or decodes it and derives a control signal for the controller therefrom.

16. A control module for connection to an interface contact of a household appliance and establishing a signal connection to route the electricity tariff information to an electronic controller of the household appliance, said control module comprising a ripple control signal receiver to transmit ripple control signals from an energy supplier to the controller.

17. The control module of claim 16, constructed as a separate part from the household appliance to allow retrofitting of the household appliance.

18. The control module of claim 16, further comprising electrical contacts for power supply and data contacts for transmission of control signals at a side of the control module facing the interface contact of the household appliance.

19. The control module of claim 16, further comprising electrical contacts for connection of a plug of a network connection line at a side of the control module facing the network connection line which supplies the household appliance with electrical energy.

20. The control module of claim 16, wherein the ripple control signal receiver includes an evaluation unit, which filters a received ripple control signal out of the network and/or decodes it and derives a control signal for the controller therefrom.

21. A household appliance, comprising:
   a controller adapted to control at least one component of the household appliance; and
   an electrical connector adapted to connect the household appliance to an electrical power grid;
   wherein the electrical connector has an electrical contact that is adapted to route a signal with electrical tariff information from the electrical power grid to the controller when the electrical contact is connected to the electrical power grid, and
   wherein the electrical tariff information is supplied by an energy supplier for the electrical power grid.

22. The household appliance according to claim 21, wherein the electrical connector comprises a second electrical contact that is adapted to supply electrical power to the household appliance.

23. The household appliance according to claim 22, further comprising an electronic module that is removeably connected to the household appliance via the electrical connector and, when the electronic module is connected to the electrical power grid, the electronic module provides the signal to the electrical contact and provides the electrical power to the second electrical contact.

24. The household appliance according to claim 21, further comprising three electrical contacts adapted to supply electrical power to the household appliance, the three electrical contacts being separate from the electrical contact.

* * * * *